US011777299B2

(12) United States Patent
Bluemmel et al.

(10) Patent No.: US 11,777,299 B2
(45) Date of Patent: Oct. 3, 2023

(54) METHOD FOR MANUFACTURING A WIRING SYSTEM

(71) Applicant: TE Connectivity Germany GmbH, Bensheim (DE)

(72) Inventors: Uwe Bluemmel, Bensheim (DE); Christian Gregor, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/481,646

(22) Filed: Sep. 22, 2021

(65) Prior Publication Data

US 2022/0094151 A1 Mar. 24, 2022

(30) Foreign Application Priority Data

Sep. 22, 2020 (DE) .......................... 102020124705.2

(51) Int. Cl.
*H02G 15/02* (2006.01)
*B23K 37/04* (2006.01)
(Continued)

(52) U.S. Cl.
CPC ......... *H02G 15/02* (2013.01); *B23K 37/0426* (2013.01); *H01R 43/0207* (2013.01);
(Continued)

(58) Field of Classification Search
CPC .... H01R 4/023; H01R 4/029; H01R 43/0207; H01R 43/02; H01R 43/0263; H01R 4/187;
(Continued)

(56) References Cited

U.S. PATENT DOCUMENTS

| 4,998,002 A * | 3/1991 | Okikawa ................ B23K 20/24 219/56.22 |
| 6,854,637 B2 | 2/2005 | Harun et al. |

(Continued)

FOREIGN PATENT DOCUMENTS

| CN | 110048282 A | 7/2019 |
| CN | 209217310 U | 8/2019 |

(Continued)

OTHER PUBLICATIONS

Extended European Search Report, Application No. 21197410.0-1201, dated Feb. 17, 2022, 9 pages.

(Continued)

*Primary Examiner* — Thiem D Phan
(74) *Attorney, Agent, or Firm* — Barley Snyder (57) ABSTRACT

A method for manufacturing a wiring system includes providing an electric cable having an electric conductor and a contact element with a termination portion, and removing a cable insulation in a first sub-portion of the electric cable. The cable insulation remains on the electric conductor in a second sub-portion of the electric cable offset from the first sub-portion. The electric conductor is welded at the first sub-portion to a termination surface of the termination portion. The first sub-portion is pressed against the termination portion and compressed during welding. A holding device encompasses the second sub-portion at least partially. The holding device supports the second sub-portion at least during the welding and compressing of the first sub-portion and maintains a position of the second sub-portion.

10 Claims, 5 Drawing Sheets

(51) Int. Cl.
  *H01R 43/02* (2006.01)
  *B23K 101/32* (2006.01)
  *B23K 20/10* (2006.01)

(52) U.S. Cl.
  CPC .......... *B23K 20/10* (2013.01); *B23K 2101/32* (2018.08); *Y10T 29/49179* (2015.01)

(58) Field of Classification Search
  CPC .... H02G 15/02; B23K 20/10; B23K 2101/32; Y10T 29/49117; Y10T 29/49179
  USPC .......... 29/860, 825, 854, 857, 861, 874, 745
  See application file for complete search history.

(56) References Cited

U.S. PATENT DOCUMENTS

| | | |
|---|---|---|
| 10,511,105 B2 | 12/2019 | Sato et al. |
| 10,601,147 B2 | 3/2020 | Tamagawa et al. |
| 10,756,498 B1 | 8/2020 | Sarraf et al. |

FOREIGN PATENT DOCUMENTS

| | | | | |
|---|---|---|---|---|
| DE | 102013021278 | * | 12/2013 | ......... H01R 43/0207 |
| DE | 102013021278 B3 | | 6/2015 | |
| JP | 2009202158 A | | 9/2009 | |
| JP | 20134406 A | | 1/2013 | |
| JP | 2015153604 A | | 8/2015 | |
| JP | 201727910 A | | 2/2017 | |
| JP | 2018147823 A | | 9/2018 | |

OTHER PUBLICATIONS

Office Action from the Japan Patent Office dated Nov. 1, 2022, corresponding to Application No. 2021-150732 with English translation, 16 pages.

\* cited by examiner

METHOD FOR MANUFACTURING A WIRING SYSTEM

CROSS-REFERENCE TO RELATED APPLICATIONS

This application claims the benefit of the filing date under 35 U.S.C. § 119(a)-(d) of German Patent Application No. 102020124705.2, filed on Sep. 22, 2020.

FIELD OF THE INVENTION

The present invention relates to a method for manufacturing a wiring system and a wiring system.

BACKGROUND

U.S. Pat. No. 6,854,637 B2 discloses a wiring system in which the electric conductor is in each case ultrasonically welded on both sides of a contact surface. It has been found that a distance in the vertical direction in a wiring region between the two contact surfaces varies greatly across different batches of the electric cable, depending on the orientation of stranded wires of the electric conductor. As a result, a production machine has to be reset for each batch of electric cable.

SUMMARY

A method for manufacturing a wiring system includes providing an electric cable having an electric conductor and a contact element with a termination portion, and removing a cable insulation in a first sub-portion of the electric cable. The cable insulation remains on the electric conductor in a second sub-portion of the electric cable offset from the first sub-portion. The electric conductor is welded at the first sub-portion to a termination surface of the termination portion. The first sub-portion is pressed against the termination portion and compressed during welding. A holding device encompasses the second sub-portion at least partially. The holding device supports the second sub-portion at least during the welding and compressing of the first sub-portion and maintains a position of the second sub-portion.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in greater detail and in an exemplary manner using embodiments and with reference to the drawings. The described embodiments are only possible configurations in which, however, the individual features as described herein can be provided independently of one another or can be omitted.

In the following FIGS. 1, 3 to 9, to aid understanding, reference is made to a coordinate system. The coordinate system has an x-axis (longitudinal direction), a y-axis (transverse direction) and a z-axis (vertical direction).

Figure 1:
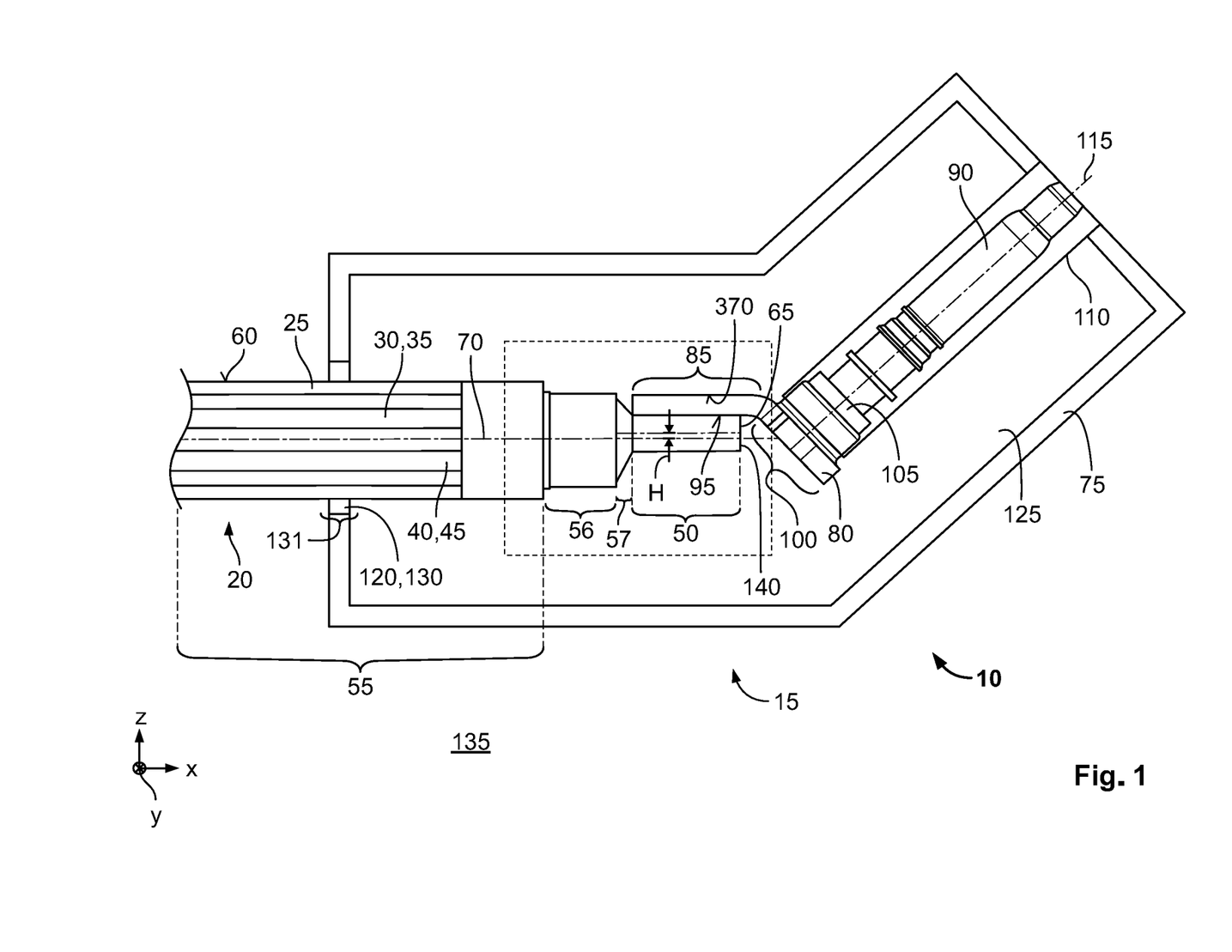
FIG. 1 is a schematic diagram of a wiring system of a motor vehicle or of a charging station, according to an embodiment.

FIG. 1 shows a schematic representation of a wiring system 10 of a motor vehicle or of a charging station for charging a motor vehicle, according to a first embodiment. The wiring system 10 has at least one contact device 15 and at least one electric cable 20, as shown in FIG. 1. In the embodiment, the contact device 15 is realized, for example, as a charging socket of the motor vehicle. The contact device 15 could also be realized as a charging plug, for example of a charging station for an electric motor vehicle. On a side facing away from the contact device 15, the electric cable 20 is electrically connected, for example, to an electrical energy storage device for storing electrical drive energy of the motor vehicle.

The electric cable 20, as shown in FIG. 1, has a cable insulation 25 and an electric conductor 30. The electric conductor 30 may be formed from a stranded-wire bundle 35 comprising a plurality of stranded wires 45. The stranded wires 45 may be twisted to form one or more stranded-wire braids 40, the stranded-wire braids 40 in turn being twisted to form the electric conductor 30. The electric conductor 30 may also have only a single stranded-wire braid 40.

The stranded wires 45 are extra-finely stranded and comprise an electrically conductive material, for example copper and/or aluminum. Other electrically conductive materials are clearly also possible. The electric conductor 30 is designed to transmit an electrical power in the high current range between 100 amperes and 1,000 amperes, in an embodiment between 100 amperes and 500 amperes.

The electric cable 20 has at least a first sub-portion 50 and a second sub-portion 55, as shown in FIG. 1, the cable insulation 25 sheathing the electric conductor 30 circumferentially in the second sub-portion 55. The cable insulation 25 comprises an electrically non-conductive material, for example plastic, in particular polyurethane or silicone. In the first sub-portion 50, the cable insulation 25 is circumferentially removed from the electric conductor 30.

The first sub-portion 50 extends along a first central axis 65, beginning at a free end 140 of the electric cable 20. A center of mass of the first sub-portion 50 is located on the first central axis 65. In the first sub-portion 50, the electric conductor 30 has a first cross-sectional area. A first centroid of the first cross-sectional area is also located on the first central axis 65. The first sub-portion 50 may have, for example, a substantially square configuration. The first central axis 65 is parallel to the x-axis.

The second sub-portion 55 extends along a second central axis 70, as shown in FIG. 1. The second central axis 70 is oriented in a direction perpendicular to the first central axis 65 (z-direction) offset from the first central axis 65. In the second sub-portion 55, the electric conductor 30 has a second cross-sectional area, the second cross-sectional area in the second sub-portion 55 being between 6 mm² and 150 mm². A center of mass of the second sub-portion 55 and a centroid of the electric conductor 30 are located on the second central axis 70. The first central axis 65 and the second central axis 70 are parallel to each other. The first central axis 65 and the second central axis 70 in this case may be arranged in a common plane. The common plane may be realized as an xz-plane. The second central axis 70 may be arranged offset in the z-direction at a distance H from the first central axis 65.

In the second sub-portion 55, the electric conductor 30 may have a first outer contour that is substantially circular, for example. In the second sub-portion 55, the cable insulation 25 is concentric with the first outer contour of the electric conductor 30. The cable insulation 25 has a second outer contour on an outer first circumferential side 60 shown in FIG. 1, the second outer contour being, for example, circular.

In addition to the first sub-portion 50 and the second sub-portion 55, the electric cable 20 may have, for example, a third sub-portion 56 and a fourth sub-portion 57 shown in FIG. 1. The third sub-portion 56 may also be omitted. In the third sub-portion 56 and the fourth sub-portion 57, as in the first sub-portion 50, the cable insulation 25 is removed, such that the electric conductor 30 is exposed circumferentially. In the third sub-portion 56, the electric conductor 30 has the second cross-sectional area. The third sub-portion 56 is arranged longitudinally adjacent to the second sub-portion 55 on a side of the second sub-portion 55 that faces towards the first sub-portion 50. On a side that faces towards the first sub-portion 50, the fourth sub-portion 57 is arranged directly adjacent to the third sub-portion 56, the third sub-portion 56 connecting the fourth sub-portion 57 to the second sub-portion 55. In the fourth sub-portion 57, the electric conductor 30 tapers from the second cross-sectional area, present in the second and third sub-portions 55, 56, to the first cross-sectional area. The fourth sub-portion 57 is realized, for example, in the manner of a truncated cone, whereas the second and the third sub-portion 55, 56 are of a substantially cylindrical shape.

In the second to fourth sub-portion 55, 56, 57, the stranded wires 45 may bear against one another circumferentially. However, the stranded wires 45 are not joined together by a material bond, but at most by a form fit, for example by twisting to form the stranded-wire braids 40 or the stranded-wire bundle 35. The stranded-wire bundle 35 and the individual stranded wires 45 running in the stranded-wire bundle 35 are also held together by the cable insulation 25 in a force-fit and form-fit manner. In the first sub-portion 50, the stranded wires 45 are welded together circumferentially, at least partially. This prevents the stranded wires 45 from coming loose from each other in the first sub-portion 50.

Further, an electrical resistance of the electric conductor 30 in the first sub-portion 50 is particularly low. Furthermore, the electric conductor 30 in the first sub-portion 50 is compacted relative to the second sub-portion 55, which means that for the same number of stranded wires 45, the first cross-sectional area in the first sub-portion 50 is reduced relative to the second cross-sectional area in the second sub-portion 55.

The contact device 15, as shown in FIG. 1, has a contact housing 75 and at least one contact element 80. The contact element 80 has a termination portion 85, a contact device 90 and, in an embodiment, a connection portion 100. The termination portion 85 and the connection portion 100 are formed in one piece from a plate-shaped material and are made of the same material. The termination portion 85 has a termination surface 95, which is flat and extends in an xy-plane. On a side facing towards the viewer in FIG. 1 and on a side facing away from the viewer, the termination portion 85 is in each case bounded by a lateral surface 370. The lateral surfaces 370 each extend in different xz planes. The lateral surface 370 is thus in each case oriented perpendicularly in relation to the termination surface 95.

The first sub-portion 50 is welded, in an embodiment ultrasonically welded, to the termination portion 85 at the termination surface 95. In FIG. 1, the connection portion 100 is arranged at an angle to the termination portion 85. A fixed end 105 of the contact device 90 in this case is attached to a side of the connection portion 100 that faces away from the termination surface 95. The contact device 90 may be a contact pin or a contact socket. The connection portion 100 electrically and mechanically connects the contact device 90 to the termination portion 85.

The contact housing 75 has, for example, a housing interior 125 shown in FIG. 1, the contact element 80 being arranged in the housing interior 125. In the housing interior 125, the contact device 90 extends along a plug-in axis 115. The housing interior 125 is open at the contact device 90 in order to insert a socket contact of a further contact device for contacting the contact device 90 along the plug-in axis 115. The plug-in axis 115, the first central axis 65 and the second central axis 70 may be arranged in a common xz-plane.

On a side that faces away from the contact device 90, the electric cable 20 in the second sub-portion 55 is led out of a housing interior 125 of the contact housing 75, through a leadthrough 120 of the contact housing 75 as shown in FIG. 1. In the shown embodiment, there is a sealing element 130 arranged in the leadthrough 120. The sealing element 130 may be made of silicone, for example, and may be connected, for example in a materially bonded manner, to the contact housing 75. The sealing element 130 bears circumferentially against a contact surface 131 of the first outer circumferential side 60 of the electric cable 20 in the second sub-portion 55 and seals the housing interior 125 from an environment 135 of the wiring system 10 in a fluid-tight manner. The contact surface 131 is part of the first outer circumferential side 60 and has a cylindrical shape relative to the second central axis 70. In particular, this prevents corrosive media, in particular water, from penetrating into the housing interior 125 and thus prevents corrosion of the contact element 80 and/or of the electric conductor 30, in particular in the first sub-portion 50.

The distance H between the first central axis 65 and the second central axis 70 is 0.5 to 15 mm with a maximum tolerance of ±0.5, ±0.2 mm, or ±0.1 mm in various embodiments. The predefined distance H ensures that the sealing element 130 is not pressed against the contact surface 131 in the leadthrough 120 on one side, for example on the side that faces towards the termination surface 95, and is relieved on the side that faces away from the termination surface 95 and a gap is possibly formed between the contact surface 131 and the sealing element 130. It is thus ensured that the sealing element 130 is in full circumferential bearing contact with the first outer circumferential side 60 of the cable insulation 25. Moreover, a good electrical and mechanical connection between the first sub-portion 50 and the termination surface 95 is ensured, as mechanical stresses in the electric cable 20 are avoided. This ensures a high fatigue strength of the welded connection between the first sub-portion 50 and the termination surface 95 even in the case of high vibrations, such as those occurring in a motor vehicle, for example on an uneven section of road. In an embodiment, the first central axis 65 runs parallel to the flat termination surface 95, and can thus be welded to the termination surface 95 in a manner favorable for stress. The parallelism between the first central axis 65 and the termination surface 95 has a tolerance of between 0° and 1°, or between 0° and 0.5° in an embodiment.

The second central axis 70 is likewise parallel to the termination surface 95, and offset in relation to the termination surface 95 in the x-direction. The second central axis 70 also has a particularly high parallelism in relation to the termination surface 95. The parallelism between the second central axis 70 and the termination surface 95 has a tolerance of between 0° and 3°, and in an embodiment between 0° and 2°.

In the embodiment, the second sub-portion 55 extends in the housing interior 125 along the second central axis 70 to outside the contact housing 75, as shown in FIG. 1. Due to the distance H, it is possible to dispense with a bending or offsetting of the electric cable 20, in particular of the electric conductor 30 in the second sub-portion 55 according to a first embodiment.

Figure 2:
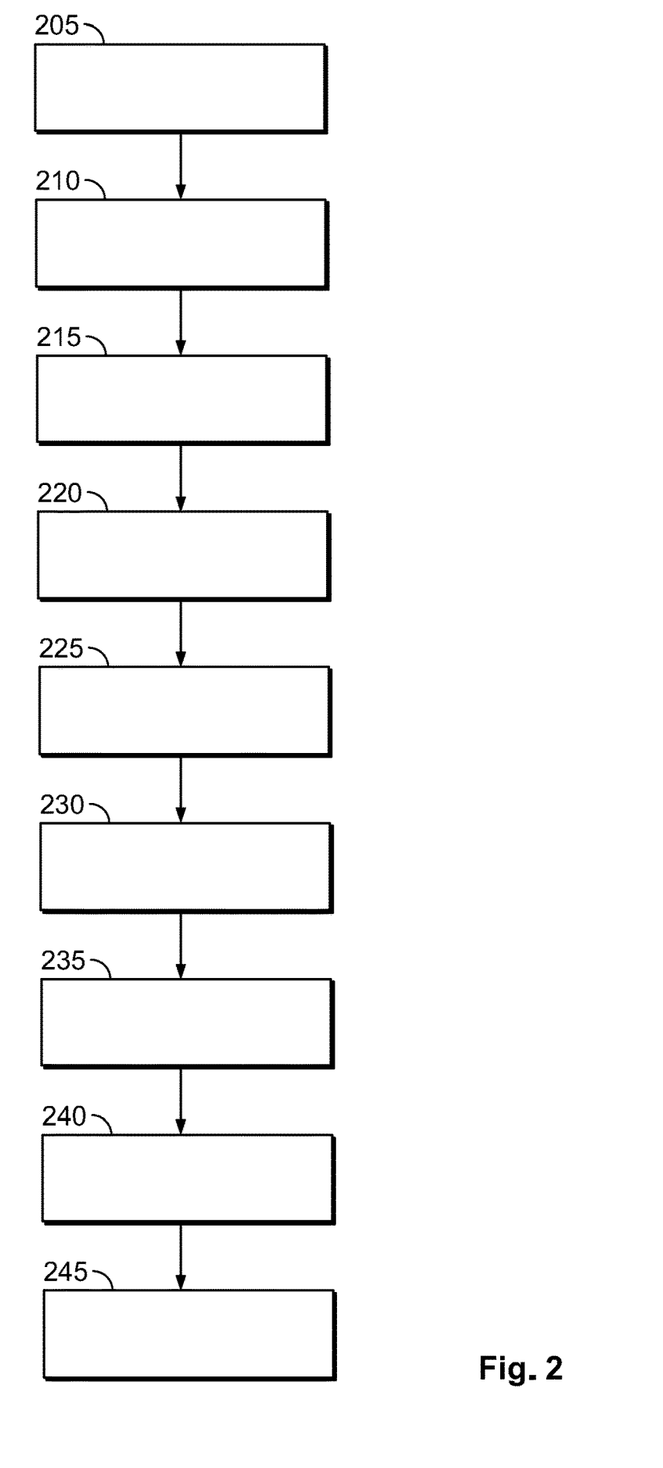
FIG. 2 is a flowchart of a method for manufacturing the wiring system of FIG. 1.
Figure 3:
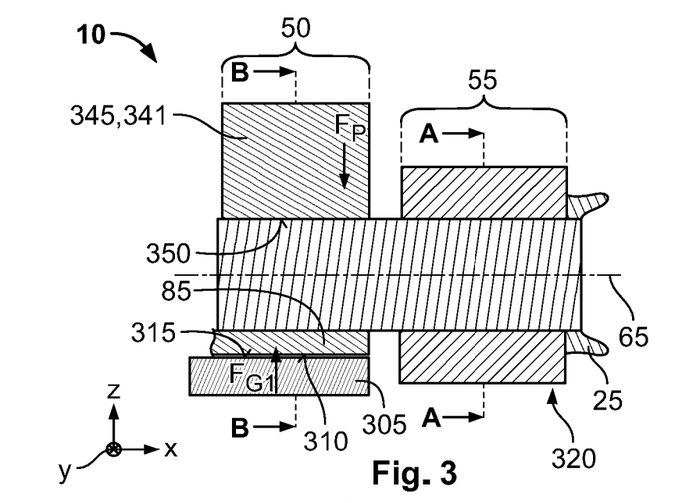
FIG. 3 is a sectional side view of a production machine and the wiring system during a fifth method step.
Figure 4:
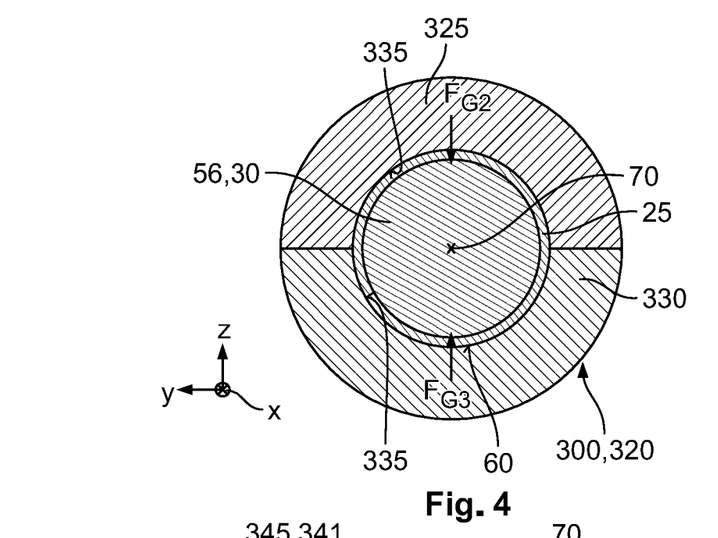
FIG. 4 is a sectional end view of the production machine and the wiring system, taken along plane A-A of FIG. 3.
Figure 5:
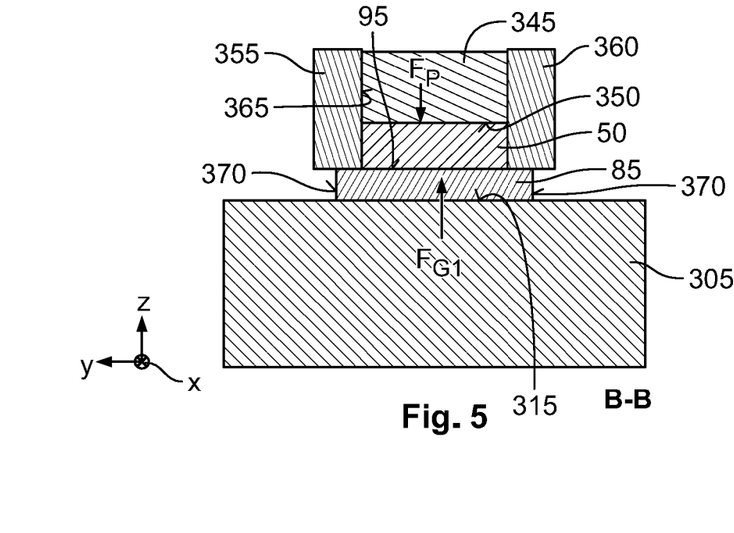
FIG. 5 is a sectional end view of the production machine and the wiring system during a sixth method step, taken along plane B-B of FIG. 3
Figure 6:
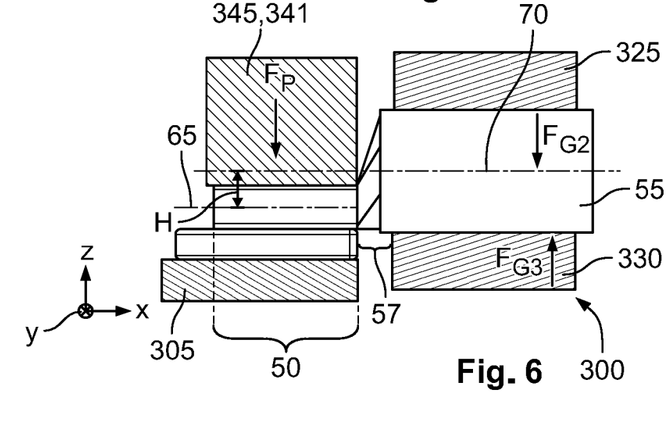
FIG. 6 is a sectional side view of the production machine during a seventh method stop.

FIG. 2 shows a flow diagram of a method for manufacturing the wiring system 10 shown in FIG. 1. FIG. 3 shows a partial side view of a production machine 300 and of the wiring system 10 during a first to fifth method step 205-225. FIG. 4 shows a sectional view, along a sectional plane A-A shown in FIG. 3, through the production machine 300 and the wiring system 10. FIG. 5 shows a sectional view, along a sectional plane B-B shown in FIG. 3, through the wiring system 10 and the production machine 300 during the sixth method step 230. FIG. 6 shows a longitudinal section through a part of the production machine 300 during the seventh method step 235 for producing the wiring system 10.

The first to fifth method steps 205 to 225 are explained in the following with reference to FIG. 3.

In the first method step 205, the electric cable 20 and the contact element 80 are provided. The contact element 80 may be connected, for example, to a transport strip. The transport strip may be arranged, for example, on a side adjacent to the termination portion 85. The transport strip serves to automatically transport the contact element 80 from a magazine of the production machine 300 to an anvil 305 of the production machine 300. The electric cable 20 may be provided, for example, ready cut to length in the first method step 205.

In a second method step 210, the production machine 300 removes the cable insulation 25, starting from the free end 140, from the first sub-portion 50 and, if applicable, also from the third and the fourth sub-portion 56, 57. In the second sub-portion 55, the cable insulation 25 remains on the electric conductor 30, and electrically insulates the electric conductor 30. Following removal of the cable insulation 25 from the first, third and fourth sub-portions 50, 56, 57, the electric conductor 30 is exposed circumferentially. In the second method step 210, the electric conductor 30 has an original cross-sectional area, across the sub-portions 50, 55, 56, 57, that corresponds to the second cross-sectional area. The first and the second central axis 65, 70 overlap. Further, across the sub-portions 50, 55, 56, 57, the first outer contour is identical and substantially cylindrical, for example.

Additionally, in the second method step 210, the termination portion 85 may be cleaned to remove contamination from the termination surface 95, for example, from the manufacture of the contact element 80.

In a third method step 215, the termination portion 85 of the contact element 80 is positioned on the anvil 305 of the production machine 300, as shown in FIG. 3. The anvil 305 is arranged, for example, in a fixed position. In this case, the termination portion 85 lies flatly on a planar first pressing surface 315 of the anvil 305, on a side that faces away from the termination surface 95 and that is planar and parallel to the termination surface 95. The first pressing surface 315 is, for example, planar and extends in an xy-plane.

In a fourth method step 220 that follows the third method step 215, the first sub-portion 50 is positioned at the termination surface 95. In the embodiment, the positioning is effected in such a manner that, in the transverse direction (y-direction), the first central axis 65, which overlaps with the second central axis 70 in the fourth method step 220, is positioned centrally in relation to a maximum extent b (cf. FIG. 5) of the termination portion 85.

In the fifth method step 225, as shown in FIGS. 3 and 4, a holding device 320 of the production machine 300 is applied to the second sub-portion 55. The holding device 320 is arranged at a distance in the x-direction from the anvil 305 and the termination portion 85.

The holding device 320, as shown in FIG. 4, has a first holding shell 325 and at least one second holding shell 330. The first holding shell 325 may be arranged, for example, on the top side of the second sub-portion 55, as in FIG. 4. The first holding shell 325 is annular, for example extending 180° around the second central axis 70. The second holding shell 330 is arranged, for example in FIG. 4, on the underside of the second sub-portion 55 and, like the first holding shell 325, has a partial annular shape, for example extending 180° around the second central axis 70. The number of holding device 325, 330 is not fixed. Thus, the holding device 320 may also have a greater number of the holding shells 325, 330 shown in FIG. 4. What is essential is that the holding shells 325, 330 each bear flatly with an inner circumferential side 335 against the first outer circumferential side 60 of the second sub-portion 55. The electric cable 20 in the second sub-portion 55 in this case is encompassed over its full circumference by the holding shells 325, 330. The inner circumferential side 335 in this case may be realized so as to correspond to the first outer circumferential side 60. In an embodiment, the holding shells 325, 330 bear against the contact surface 131 of the second sub-portion 55 of the electric cable 20, against which the sealing element 130 bears in the assembled state.

In a sixth method step 230 that follows the fifth method step 225, a welding device 341, such as a sonotrode 345 shown in FIGS. 3 and 5, is placed on the first sub-portion 50, on a side that faces away from the termination portion 85. The welding device 341 may also be realized in a different manner. Thus, for example, an electric welding process would also be possible. The welding device 341 has a second pressing surface 350 on the side that faces towards the termination portion 85, the second pressing surface 350 being oriented parallel to the first pressing surface 315 of the anvil 305 and the termination surface 95. In an embodiment, the second pressing surface 350 extends in an xy-plane.

In an embodiment, as shown in FIG. 5, a first jaw 355 and a second jaw 360 that is arranged oppositely in the y-direction are arranged at the side of the sonotrode 345 on the termination portion 85. The first and the second jaw 355, 360 each have a holding surface 365 laterally on a side that faces towards the first sub-portion 50, the holding surface 365 in each extending, for example, in a yz-plane. In this case the holding surface 365 of the first jaw 355 is arranged parallel to the second jaw 360 that is arranged opposite the holding surface 365.

In the embodiment shown in FIG. 5, the jaw 355, 360 is placed directly onto the termination surface 95 in the z-direction. There may also be a gap in the z-direction located between the jaw 355, 360 and the termination surface 95, but the gap in the z-direction is narrower in an embodiment than a single diameter of the stranded wire 45 or of the stranded-wire braid 40.

In a seventh method step 235 that follows the sixth method step 230, as shown in FIG. 6, the first sub-portion 50 is welded to the termination surface 95 by a welding process, in particular ultrasonic welding. The ultrasonic welding is effected by known ultrasonic welding methods. In this case, a mechanical vibration having a frequency in the ultrasonic range is introduced into the first sub-portion 50 via the sonotrode 345, on the side that faces away from the termination surface 95.

In addition, the welding device 341 presses the sonotrode 345 against the first sub-portion 50 with a pressing force FP shown in FIGS. 5 and 6. The pressing force FP acts vertically against the first pressing surface 315 and is oriented in the z-direction. At the first pressing surface 315, the anvil 305 provides a first counterforce FG1, which is directed contrary to the pressing force FP. The termination portion 85 is thereby prevented from being deflected in the z-direction. The pressing force FP is selected in such a manner that during the welding process, in particular the ultrasonic welding process, the second pressing surface 350 compresses and compacts the first sub-portion 50. The compression by the pressing force FP in this case reduces cavities between the individual stranded wires 45, such that, despite the reduced first cross-sectional area, the electrical conductivity in the first sub-portion 50 and the second sub-portion 55 is identical.

The second cross-sectional area, which corresponds to the original cross-sectional area of the first sub-portion 50 of the electric conductor 30, is in this case reduced to the first cross-sectional area of the first sub-portion 50. Further, the first sub-portion 50 is formed. During the welding process, in particular the ultrasonic welding process, the stranded wires 45 of the electric conductor 30 in the first sub-portion 50 are welded together. Due to the compressing, the first central axis 65 is displaced from the overlapping arrangement with the second central axis 70, towards the termination surface 95. The predefined distance H can be set with precision by the pressing force FP and the first counterforce FG1. Further, a parallelism of the first central axis 65 to the termination surface 95 can be maintained with a small tolerance, over an extent of the first sub-portion 50 along the first central axis 65, of ±0.5 mm, ±0.2 mm, or ±0.1 mm.

To limit lateral deflection of the first sub-portion 50, during the seventh method step 235 the jaws 355, 360 are arranged to the side of the first sub-portion 50, inside the lateral surface 370 in the transverse (y-direction). The jaw 355, 360 may comprise a ceramic material or a material on the holding surface 365 that prevents the first sub-portion 50 from adhering to the jaw 355, 360 during welding.

During the welding process, the position of the holding shells 325, 330 is maintained and remains unchanged throughout the welding process, as shown in FIG. 6. The first holding shell 325 provides a second counterforce FG2, and the second holding shell 330 provides a third counterforce FG3. The second counterforce FG2 and the third counterforce FG3 each act in the z-direction. The third counterforce FG3 in this case is directed against the pressing force FP and prevents the second sub-portion 55 from being displaced in the z-direction. This ensures that, in the compressing of the first sub-portion 50, the first sub-portion 50 is arranged eccentrically in relation to the second central axis 70 following compression, such that the first central axis 65 has the predefined distance H between the first central axis 65 and the second central axis 70.

The second counterforce FG2, provided by the first holding shell 325 arranged on top in FIG. 6, acts parallel to the pressing force FP and prevents the second sub-portion 55 from bending upwards in the z-direction during the compressing of the first sub-portion 50. The cylindrical shape of the second sub-portion 55 during the compressing process is thereby ensured. Further, the third and the fourth sub-portions 56, 57 are realized during the compressing and welding processes. The third sub-portion 56 in this case is formed into a truncated cone shape, with its third central axis 375 inclined at an angle to the first and second central axes 65, 70 and intersecting the first and the second central axis 65, 70.

After an end position of the second pressing surface 350 has been attained, and after the first sub-portion 50 has been finish-welded to the termination portion 85, the second pressing surface 350 is removed from the first sub-portion 50 in an eighth method step 240. Further, the jaws 355, 360 are removed laterally in the y-direction from the first sub-portion 50. Following removal of the second pressing surface 350 and of the jaws 355, 360, the holding shells 325, 330 are removed. The subsequent removal of the holding shells 325, 330 has the advantage that a release force can be supported by the holding shell 325, 330 during removal of the jaw 355, 360 and/or of the sonotrode 345.

The holding device 320 supports the second sub-portion 55 at least during the compressing and welding of the first sub-portion 50 and maintaining a position of the second sub-portion 55. Due to the support, a position of the second sub-portion 55 relative to the first sub-portion 50 is maintained even after welding, thereby preventing unwanted deformation of the second sub-portion 55. Moreover, a distance between a first central axis 65, along which the first sub-portion 50 extends after compression, and the second central axis 70, along which the second sub-portion 55 extends, can be defined with a narrow tolerance.

In an embodiment, the holding device 320 encompasses the second sub-portion 55, in a region of the contact surface 131 for, in such a manner that an outer contour of the second sub-portion 55 is maintained throughout the compressing and welding. Crushing, in particular of the cable insulation, is avoided. Damage to the contact surface 131 during displacement of the central axis of the first sub-portion 50 and welding of the first sub-portion 50 can thereby be prevented. This ensures a reliable fluidic seal at the contact surface 131, for example at a sealing means, for passing the electric cable out from the housing 75 of the contact device 15. In particular, the concentricity of the cable insulation in the second sub-portion 55 is ensured.

In a ninth method step 245 that follows the eighth method step 240, the wiring system 10 with the welded-on contact element 80 is mounted in the contact housing 75.

The method described above has the advantage that the distance H can be set in a defined manner independently of the layout of the stranded wires 45, such that, following mounting of the wiring system 10 in the contact housing 75, the sealing element 130 bears with full circumferential contact against the cable insulation 25, and thus a reliable sealing of the housing interior 125 against the environment 135 is ensured. Further, a time-consuming set-up of the production machine 300 after a batch change of the electric cable 20 can be dispensed with. As a result, the wiring system 10 can be manufactured particularly cost-effectively.

In a development of the method described in FIG. 3, the anvil 305 can be moved in the z-direction with the second pressing surface 350 during the compressing and welding of the first sub-portion 50, in order to set a particularly large distance H of the first sub-portion 50, with the first central axis 65, in relation to the second sub-portion 55. In particular, it is thereby possible to dispense with offsetting the electric cable 20, since the distance H in the z-direction is established during compressing and welding processes. Moreover, additional offsetting, bending or the like of the electric cable 20 within the contact housing 75 can be dispensed with.

Figure 7:
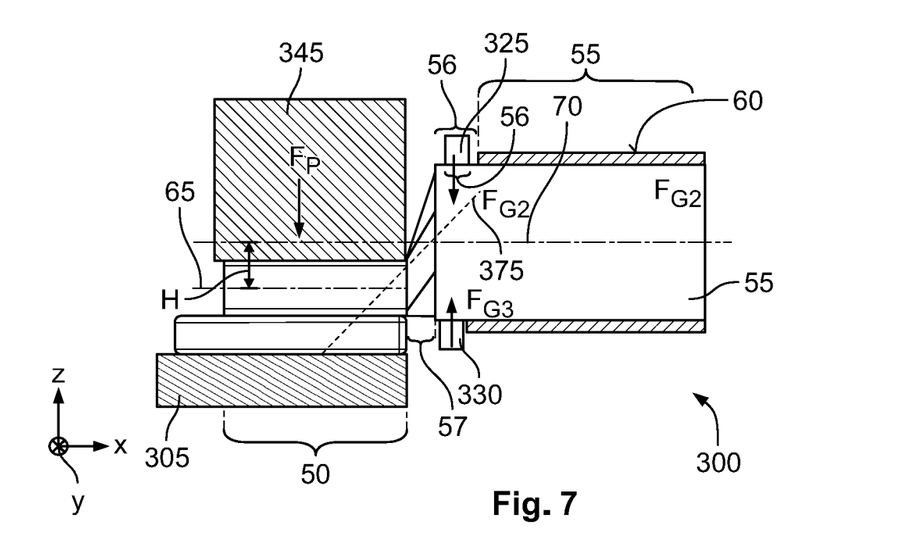
FIG. 7 is a sectional side view through the production machine performing a method according to another embodiment for manufacturing the wiring system of FIG. 1.

FIG. 7 shows a longitudinal section through the production machine 300 executing a method for manufacturing the wiring system 10 according to a second embodiment. The method is substantially identical to the method explained in FIG. 3. In the following, only the differences between the method explained in FIG. 7 and the method explained in FIG. 3 will be discussed. The holding shells 325, 330 are positioned at the third sub-portion 56. The first and the second holding shell 325, 330 are positioned on the electric conductor 30 directly adjacent to an axial end of the cable insulation 25 and encompass the electric conductor 30 with the inner circumferential side 335.

Figure 8:
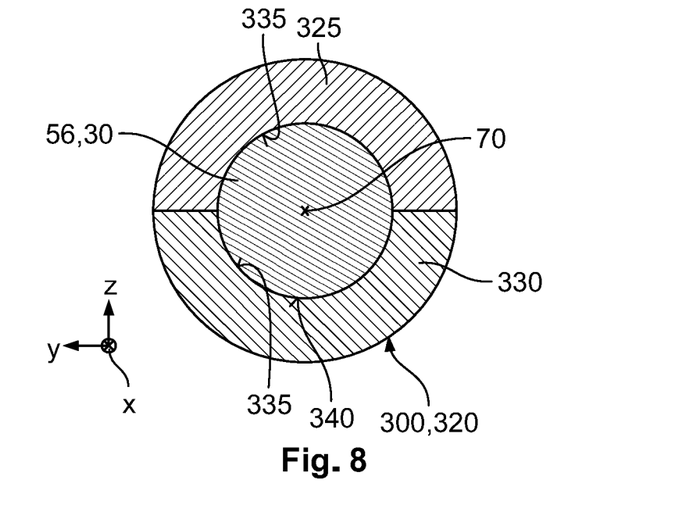
FIG. 8 is a sectional end view of the production machine and the wiring system taken along plane A-A of FIG. 3, during the seventh method step.

FIG. 8 shows a sectional view, along the sectional plane A-A shown in FIG. 3, during the seventh method step 235. In this case, during the seventh method step 235, the inner circumferential side 335 of the holding shells 325, 330 bears against the third sub-portion 56 and provides the second and third counterforce FG2, FG3, which is introduced directly into the electric conductor 30. This design has the advantage that, compared to FIG. 3, bending of the third sub-portion 56 during the compressing of the first sub-portion 50 is avoided.

Figure 9:
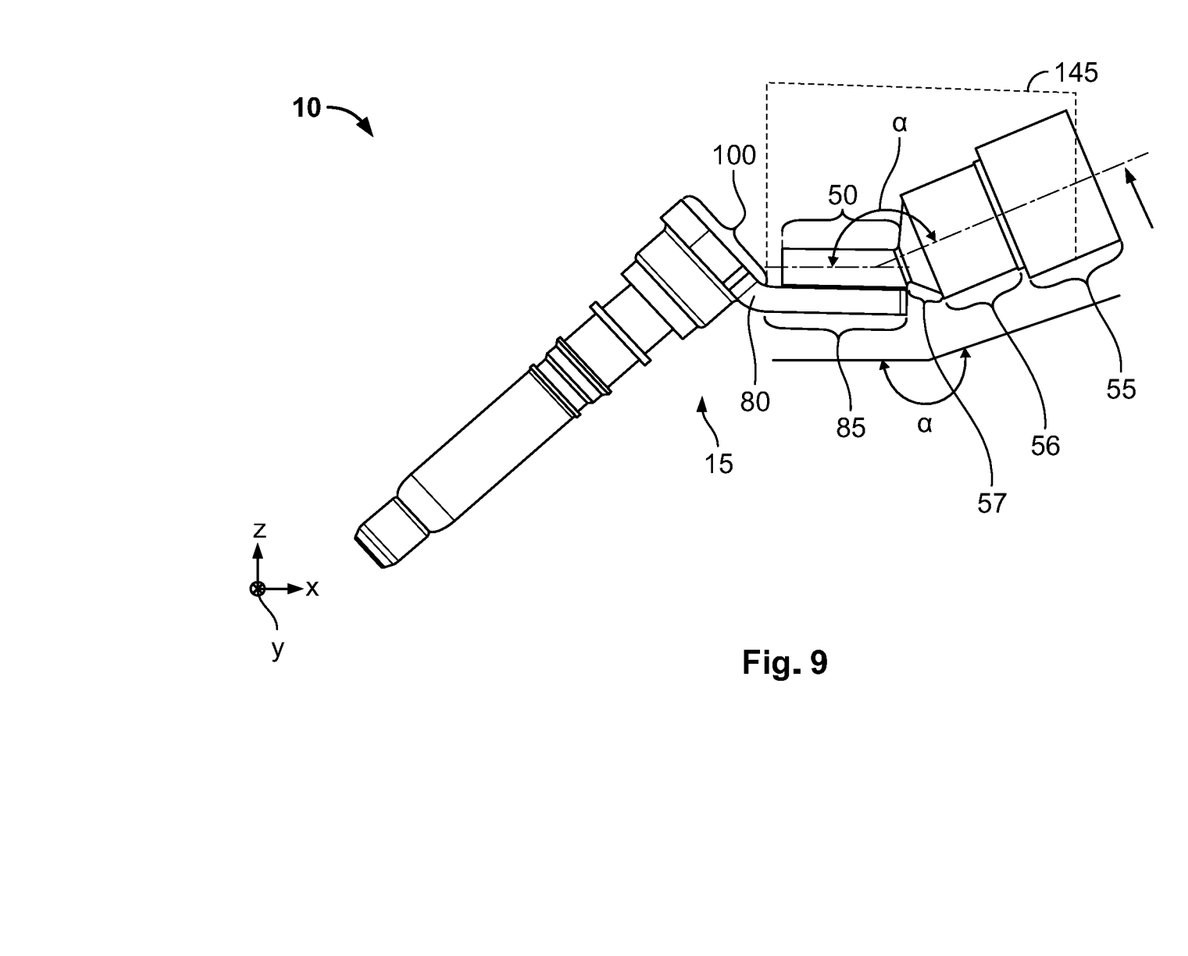
FIG. 9 is a schematic diagram of a wiring system of a motor vehicle or of a charging station, according to another embodiment.

FIG. 9 shows a schematic representation of a wiring system 10 of a motor vehicle or of a charging station for charging a motor vehicle, according to a second embodiment. The second embodiment of the wiring system 10 shown in FIG. 9 is substantially identical to the first wiring system 10 explained in FIG. 1. In the following, only the differences between the wiring system 10 shown in FIG. 9 and the wiring system 10 shown in FIG. 1 will be discussed. As a difference, for example, the second sub-portion 55 to the fourth sub-portion 57 are arranged bent at a predefined angle α in relation to the first sub-portion 50. The angle α is obtuse in an embodiment. In particular, the angle α has a value of from 125° to 180°.

The first central axis 65 and the second central axis 70 are likewise arranged at an angle α shown in FIG. 9. The first central axis 65 and the second central axis 70 are arranged in a common plane 145, the common plane 145 being inclined, perpendicularly in an embodiment, in relation to the termination surface 95.

To manufacture the wiring system 10 shown in FIG. 9, the method explained in FIG. 2 may be used. Additionally, in the sixth method step 230, the electric conductor is bent in the third and the fourth sub-portion 56, 57, such that the second sub-portion 55 is arranged at an angle α in relation to the first sub-portion 50. The bending may be effected, for example, by moving the holding device 320 relative to the anvil 305 and the sonotrode 345. To achieve the predefined angle α, the second sub-portion 55 may also be bent over relative to the first sub-portion 50 during bending of the electric cable 20. The holding device 320 keeps the second sub-portion 55 inclined while the first sub-portion 50 is being welded. The method has the advantage that, following execution of the method, the second sub-portion 55 is precisely aligned at the predefined angle α.

What is claimed is:

1. A method for manufacturing a wiring system, comprising:
   providing an electric cable having an electric conductor and a contact element with a termination portion;
   removing a cable insulation in a first sub-portion of the electric cable, the cable insulation remaining on the electric conductor in a second sub-portion of the electric cable offset from the first sub-portion;
   welding the electric conductor at the first sub-portion to a termination surface of the termination portion, the first sub-portion is pressed against the termination portion and compressed during welding, the electric conductor extends along a first central axis in the first sub-portion and the electric conductor extends along a second central axis in the second sub-portion, the first central axis is spaced apart from the second central axis in a direction perpendicular to the first central axis and the second central axis; and
   providing a holding device encompassing the second sub-portion at least partially, the holding device supporting the second sub-portion at least during the welding and compressing of the first sub-portion and maintaining a position of the second sub-portion.

2. The method of claim 1, wherein the first central axis and the second central axis overlap prior to compression.

3. The method of claim 2, wherein the first sub-portion is pressed in such a manner that the first central axis is parallel to the termination surface.

4. The method of claim 2, wherein the first sub-portion is bent relative to the second sub-portion in such a manner that the first sub-portion and the second sub-portion are arranged at a predefined angle relative to each other.

5. The method of claim 1, wherein the holding device encompasses the second sub-portion in a region of a contact surface for a sealing element, and an outer contour of the second sub-portion is maintained throughout the compressing and welding.

6. The method of claim 1, further comprising placing a sonotrode on the first sub-portion on a side that faces away from the termination surface.

7. The method of claim 6, wherein the sonotrode introduces a pressing force acting in a direction of the termination surface into the first sub-portion.

8. The method of claim 7, wherein the first sub-portion is supported laterally by a pair of jaws that are positioned at an angle in relation to the termination surface.

9. The method of claim 1, wherein the electric conductor has an original cross-sectional area across the first sub-portion and the second sub-portion prior to welding, the original cross-sectional area is 6 mm$^2$ to 150 mm$^2$.

10. The method of claim 9, wherein the electric conductor is compacted in the first sub-portion, a first cross-sectional area of the first sub-portion is smaller than the original cross-sectional area.

* * * * *